E. B. ROBY.
NECKBAND.
APPLICATION FILED JAN. 16, 1918.
1,283,912.
Patented Nov. 5, 1918.
3 SHEETS—SHEET 3.
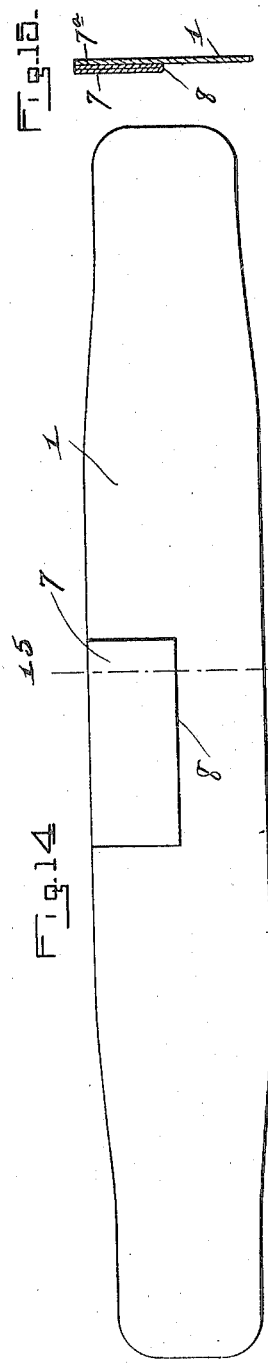
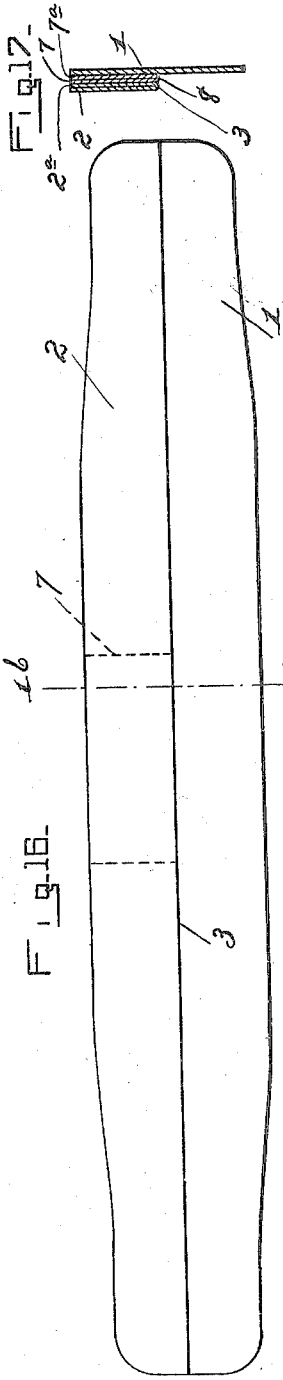
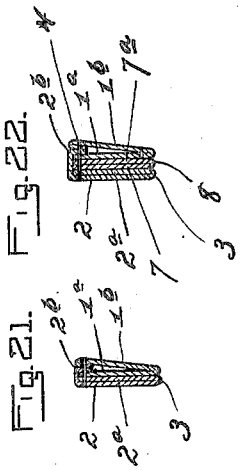
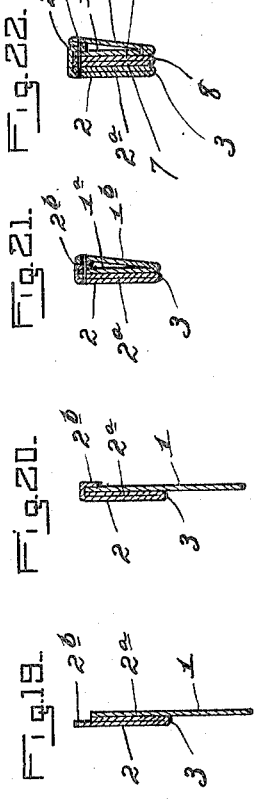
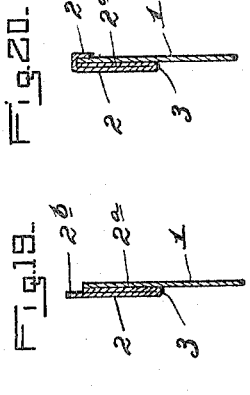
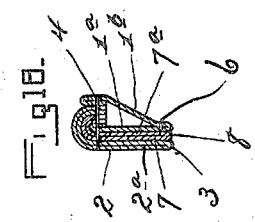
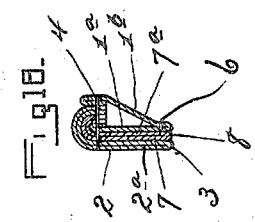
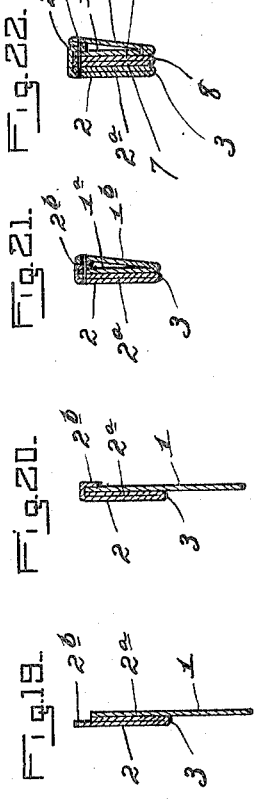
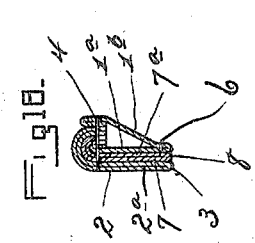
Inventor
Edward B. Roby
By Frank C. Curtis
Attorney

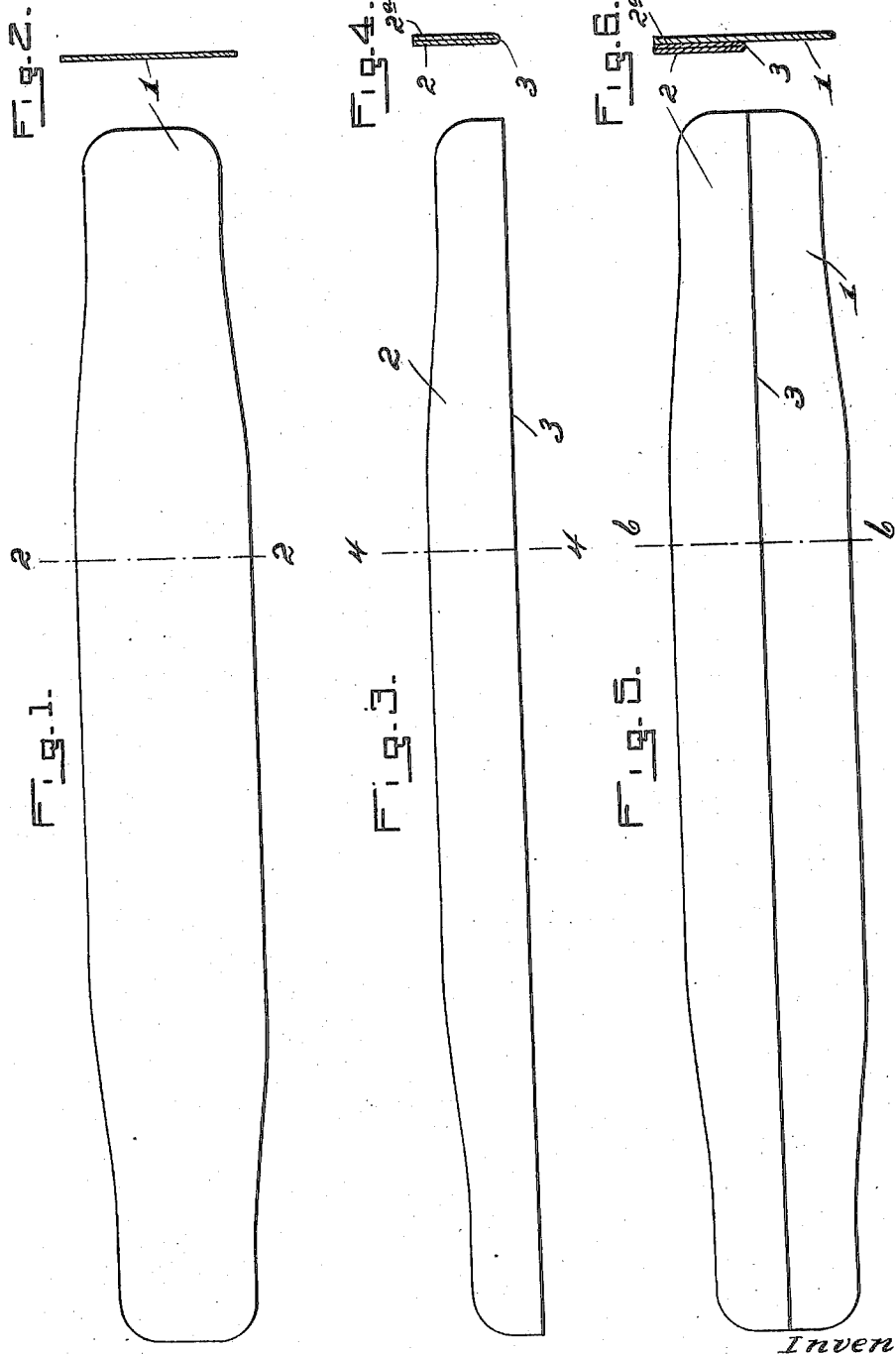

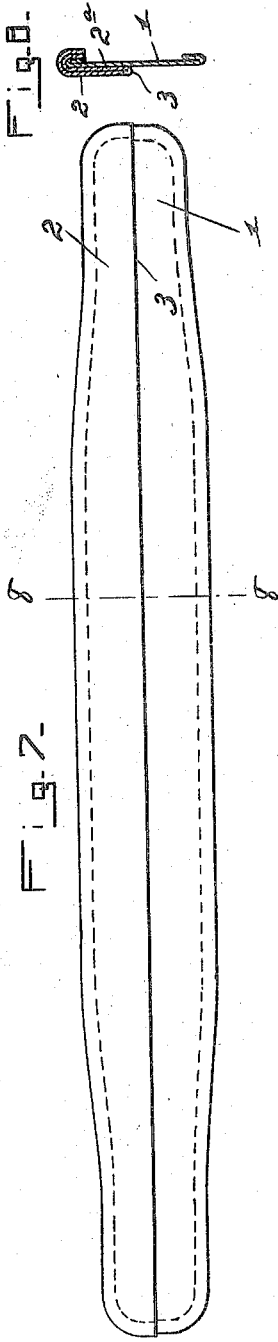
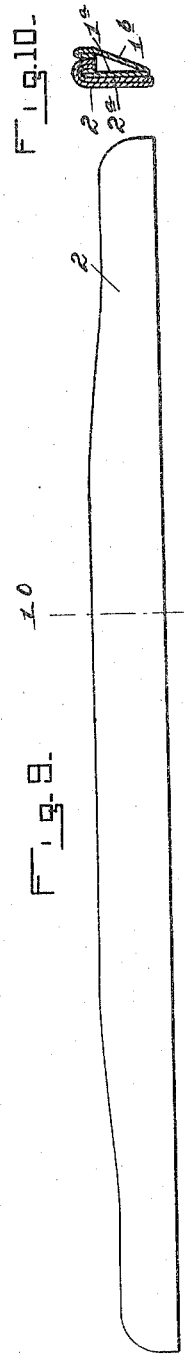
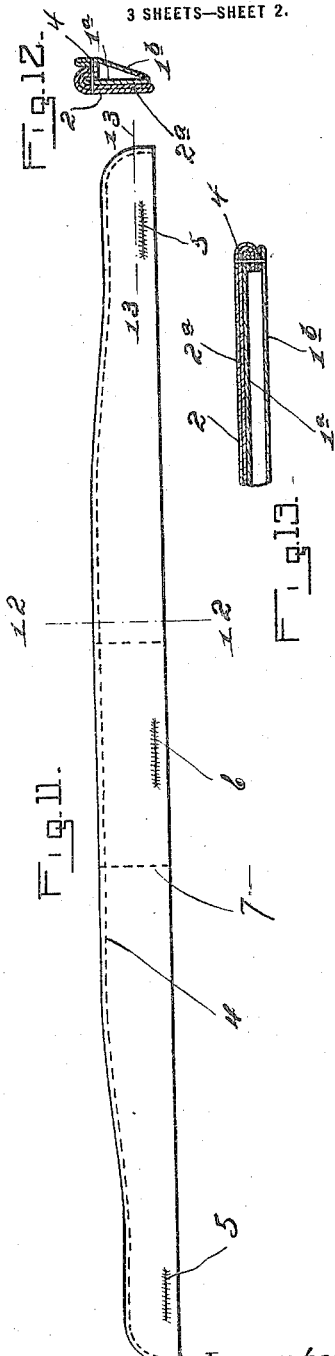

UNITED STATES PATENT OFFICE.

EDWARD B. ROBY, OF TROY, NEW YORK, ASSIGNOR TO STANLEY M. STONE, OF ALBANY, NEW YORK.

NECKBAND.

1,283,912.

Specification of Letters Patent.

Patented Nov. 5, 1918.

Application filed January 16, 1918. Serial No. 212,016.

*To all whom it may concern:*

Be it known that I, EDWARD B. ROBY, a citizen of the United States, residing at Troy, county of Rensselaer, and State of New York, have invented certain new and useful Improvements in Neckbands, of which the following is a specification.

Reference may be had to the accompanying drawings, and the reference characters marked thereon, which form a part of this specification. Similar characters refer to similar parts in the several figures therein.

This invention relates to the manufacture of neckbands and similar articles made of a plurality of plies of textile fabric or the like.

The principal objects of the invention are to simplify the manufacture of the bands, and to produce a uniform product.

Other objects will appear in connection with the following description.

Figure 1 of the drawings is a plan view of a flat strip adapted to form one of the component members of the band.

Fig. 2 is a cross-section of the same taken on the broken line 2—2 in Fig. 1.

Fig. 3 is a plan view of a folded strip, adapted to form another component member of the band.

Fig. 4 is a cross-section of the same taken on the broken line 4—4 in Fig. 3.

Fig. 5 is a plan view showing said folded strip superimposed upon said flat strip, as in the manufacture of a band in accordance with my improved method.

Fig. 6 is a vertical cross-section of the same taken on the broken line 6—6 in Fig. 5.

Fig. 7 is a plan view of the strip shown in Fig. 5, after the edge-portions of said strips have been inturned over upon the flat strip.

Fig. 8 is a cross-section of the same taken on the broken line 8—8 in Fig. 7.

Fig. 9 is a plan view of the strips with the edges inturned and the flat strip folded along its longitudinal middle.

Fig. 10 is a cross-section of the same taken on the broken line 10—10 in Fig. 9.

Fig. 11 is a plan view of the finished band.

Fig. 12 is a cross-section of the same taken on the broken line 12—12 in Fig. 11.

Fig. 13 is a longitudinal section of the same taken on the broken line 13—13 in Fig. 11.

Fig. 14 is a plan view of a flat strip similar to that shown in Fig. 1, with a shorter folded strip superimposed thereupon as in the manufacture of a modified form of pocket-neckband in accordance with my invention.

Fig. 15 is a cross-section of the same taken on the broken line, 15—15 in Fig. 14.

Fig. 16 is a similar view showing a folded strip similar to that shown in Fig. 3 superimposed upon said shorter folded strip and said flat strip shown in Fig. 14.

Fig. 17 is a cross section of the same taken on the broken line 17—17 in Fig. 16.

Fig. 18 is a cross-section similar to Fig. 12, taken through the back buttonhole of a pocket-neckband made in the manner illustrated in Figs. 14 to 17.

Figs. 19, 20 and 21 are sectional views similar to Figs. 6, 8 and 12 respectively, illustrating a modified form of band made in accordance with my invention.

Fig. 22 is a sectional view similar to Fig. 18, showing this same modification applied to a pocket-neckband.

In making a neckband or the like in accordance with my invention, I superimpose upon a flat strip, 1, a strip, 2, $2^a$, folded longitudinally to form a folded edge, 3, with its edge-portions along its ends and the side opposite said folded edge coincident with corresponding edge-portions of the strip, 1, as shown in Fig. 5.

The strip, 2, is thus folded preferably along its longitudinal middle making its fold-members, 2 and $2^a$, of equal depth, as shown in Figs. 4 and 6; but for certain purposes of the invention, the inner fold-member, $2^a$, may if desired be made of less depth than the outer fold-member, 2, of said folded strip.

After the folded strip, 2, $2^a$, has thus been superimposed upon the flat strip, the edge-portions of the strips thus assembled are inturned over upon the flat strip, 1, as shown in Fig. 8, which inturning operation can be advantageously performed by the use of turning or folding machines, as is well understood in the art of making collars, cuffs and the like.

The edges of the strips are thus inturned symmetrically upon opposite sides of the longitudinal middle of the flat strip, 1, the result of such inturning operation being shown in Fig. 7. The flat strip, 1, is then folded along its longitudinal middle, causing its inturned edge-portions on one side of its longitudinal middle to coincide with the inturned edge-portions of both strips on the other side of its longitudinal middle, with all said inturned edge-portions between the fold-members, 1ª, and 1ᵇ, thus formed, as shown in Fig. 10.

The band is then finished by securing all of said inturned edge-portions together by a line of stitching, 4, which preferably passes through all of the fold-members, and providing it with buttonholes, 5 and 6, if desired, which buttonholes may extend through all or any desired number of the plies of the band thus formed. The band thus formed, presents finished folded edges on all sides with an opening between the folded edges of its members along one side adapted for the insertion of the neck or sleeve portion of a shirt or the like, not shown.

The described method of making the band conceals all of the cut edges of the strips from view, and makes it possible to use inturning and folding machines in the manufacture of the bands which materially reduces their cost of manufacture.

In some forms of pocket-neck bands wherein the opening in the pocket is formed by leaving free from the body of the garment on opposite sides of the buttonhole, the edge-portion of the plies in which the buttonhole is formed, it is desirable to insert a shorter strip in the band opposite the said buttonholed portion, between which shorter strip and the plies through which the buttonhole does not pass, the body portion of the garment is stitched at this point.

In making such a pocket-neckband in accordance with my invention, I first superimpose upon the flat strip, 1, a shorter folded strip, 7, 7ª, folded to form a longitudinal folded edge, 8, the edge-portions of said shorter folded strip along the side opposite said folded edge coinciding with corresponding edge-portions of the flat strip, 1, as shown in Figs. 14 and 15.

The folded strip 2, 2ª, is then superimposed upon said shorter folded strip, 7, and the flat strip, 1, as shown in Figs. 16 and 17, after which the edges of the strips are inturned and the flat strip, 1, is folded along its longitudinal middle and the band finished, all as previously described, a cross section of the resultant band being shown in Fig. 18.

The shorter strip, 7, is preferably folded along its longitudinal middle, making its fold members, 7 and 7ª, of equal depth; but for certain purposes of the invention they may be made of different depths if desired.

A buttonhole may be formed in such a pocket-neckband through the fold members, 1ª and 1ᵇ, of the flat strip, 1, or through the fold members, 2, 2ª, as may be desired, said shorter strip, 7, 7ª, taking the place of the buttonholed members in securing the neckband to the body of the garment opposite such buttonholed portion of the band.

For certain purposes of the invention, the outer fold-member, 2, may be made deeper than the inner fold-member, 2ª, and the folded strip, 2, 2ª, thereby formed, superimposed upon the flat strip, 1, with the free edge of the inner fold-member, 2ª, coincident with the longitudinal edge of said flat strip, thus leaving a projecting edge-portion, 2ᵇ, of the outer fold-member, 2, adapted to be inturned over the said coincident edges of the inner fold-member, 2ª, and the flat strip, 1, as shown in Fig. 20. A cross-section of the finished band so made is shown in Fig. 21.

In carrying out this feature with respect to the pocket-neckband, the shorter folded strip is superimposed upon the flat strip with the edges of its fold-members, 7, 7ª, along the side opposite the fold, 8, coincident with longitudinal edge-portions of said flat strip, a cross-section of the resultant band being shown in Fig. 22.

I make no claim specifically to the constructions shown in Figs. 19, 20, 21 and 22, as the specific constructions therein shown are not of my invention.

What I claim as new and desire to secure by Letters Patent is—

1. A band comprising a strip folded along its longitudinal middle with the edge-portions of the respective fold-members coincidently inturned along the ends and the side opposite the fold, and a second strip having a longitudinal folded edge and having its edge portions along its ends and the side opposite said folded edge coincident with, inturned between, and stitched to, the corresponding inturned edge-portions of the fold-members of said first-mentioned strip.

2. A band comprising a strip folded along its longitudinal middle with the edge-portions of the respective fold-members coincidently inturned along the ends and the side opposite the fold, and a second strip having a longitudinal folded edge coincident with a longitudinal fold of said first-mentioned strip, and having its edge-portions along its ends and the side opposite said folded edge coincident with, inturned between, and stitched to, the corresponding inturned edge-portions of the fold-members of said first-mentioned strip.

3. A band comprising a strip folded along its longitudinal middle with the edge-portions of the respective fold-members coincidently inturned along the ends and the side opposite the fold, and a second strip folded along its longitudinal middle and having its edge-portions along its ends and the side opposite the fold coincident with, inturned between, and stitched to, the inturned edge-portions of said first-mentioned strip.

4. A band comprising a strip folded along its longitudinal middle with the edge-portions of the respective fold-members coincidently inturned along the ends and the side opposite the fold, a second strip having a longitudinal folded edge coincident with the fold of said first-mentioned strip and having edge-portions along its ends and the side opposite the fold coincident with, inturned between, and stitched to, the inturned edge-portions of said first-mentioned strip; and a shorter strip interposed between said other strips, said shorter strip having a longitudinal folded edge and having its edge-portions along its side opposite said folded-edge coincident with, inturned between, and stiched to, inturned edge-portions of said other strips.

5. A band comprising a strip folded along its longitudinal middle with the edge-portions of the respective fold-members coincidently inturned along the ends and the side opposite the fold, a second strip having a longitudinal folded edge coincident with the fold of said first-mentioned strip and having edge-portions along its ends and the side opposite the fold coincident with, inturned between, and stitched to, the inturned edge-portions of said other strips; and a shorter strip interposed between said other strips, said shorter strip being folded along its middle longitudinally of the band and having its edge-portions along its side opposite the fold coincident with, inturned between, and stitched to, inturned edge-portions of said other strips.

6. That improvement in the art of making bands which consists in folding a strip to form a longitudinal folded edge; superimposing said folded strip upon a flat strip with the outer member of said folded strip extending from said folded edge to edge-portions along its ends and the side opposite said folded edge coincident with corresponding edge-portions of said flat strip; inturning the edge-portions of said flat strip and the coincident edge-portions of said folded strip over upon said flat strip with the inturned edge-portions on opposite sides of the longitudinal middle of said flat strip symmetrical; folding said flat strip along its longitudinal middle, causing its inturned edge-portions on one side of its longitudinal middle to coincide with the inturned edge-portions of both strips on the other side of its longitudinal middle with all said inturned edge-portions between the fold-members of said flat strip; and stitching all of said inturned edge-portions together.

7. That improvement in the art of making bands which consists in folding a strip along its longitudinal middle; superimposing said folded strip upon a flat strip with its edge-portions along its ends and the side opposite the fold coinciding with corresponding edge-portions of said flat strip; inturning the edge-portions of said flat strip and the coincident edge-portions of said folded strip over upon said flat strip, with the inturned edge-portions on opposite sides of the longitudinal middle of said flat strip symmetrical; folding said flat strip along its longitudinal middle, causing its inturned edge-portions on one side of its longitudinal middle to coincide with the inturned edge-portions of both strips on the other side of its longitudinal middle, with all said inturned edge-portions between the fold-members of said flat strip; and stitching all of said inturned edge-portions together.

8. That improvement in the art of making bands which consists in folding a strip to form a longitudinal folded edge; superimposing said folded strip upon a longer flat strip, with the inner member of said folded strip extending from said folded edge to edge-portions along its side opposite said folded edge coincident with corresponding edge-portions of said flat strip; superimposing upon said folded strip and said flat strip, a folded strip longer than said first-mentioned folded strip, with the outer member of said second-mentioned folded strip extending from its folded edge to edge-portions along its ends and the side opposite said folded edge coincident with corresponding edge-portions of said flat strip; inturning the edge-portions of said flat strip and the coincident edge-portions of said folded strips over upon said flat strip, with the inturned edge-portions on opposite sides of the longitudinal middle of said flat strip symmetrical; folding said flat strip along its longitudinal middle, causing its inturned edge-portions on one side of its longitudinal middle to coincide with the inturned edge-portions of both strips on the other side of its longitudinal middle; and stitching all of said inturned edge-portions together.

9. That improvement in the art of making bands which consists in folding a strip to form a longitudinal folded edge; superimposing said folded strip upon a flat strip; inturning edge-portions of said strips symmetrically on opposite sides of a line extending longitudinally of said flat strip; folding said flat strip along said longitudinal line, causing inturned edge-portions of the outer fold-member of said first-mentioned strip to coincide with inturned edge-portions of the outer fold-member of said second-mentioned strip; and stitching all of said inturned edge-portions together.

10. That improvement in the art of making bands which consists in folding a strip to form a longitudinal folded edge; superimposing said folded strip upon a longer flat strip; superimposing upon said folded strip and said flat strip, a folded strip longer than said first-mentioned folded strip; inturning edge-portions of said strips symmetrically on opposite sides of a line extending longitudinally of said flat strip; folding said flat strip along said longitudinal line causing inturned edge-portions of its outer fold-member to coincide with inturned edge-portions of the outer fold-member of said third-mentioned strip; and stitching together all of said inturned edge-portions and an edge-portion of said shorter folded strip along the side opposite its folded edge.

11. That improvement in the art of making bands which consists in folding a strip to form a longitudinal folded edge; superimposing said folded strip upon a flat strip; inturning edge-portions of said strips over upon said flat strip symmetrically on opposite sides of a line extending longitudinally of said flat strip; folding said flat strip along said longitudinal line, causing inturned edge-portions of the outer fold-member of said first-mentioned strip to coincide with inturned edge-portions of the outer fold-member of said second-mentioned strip, with all said inturned edge-portions between the fold-members of said second-mentioned strip; and stitching all of said inturned edge-portions together.

12. That improvement in the art of making bands which consists in folding a strip to form a longitudinal folded edge; superimposing said folded strip upon a longer flat strip; superimposing upon said folded strip and said flat strip, a folded strip longer than said first-mentioned folded strip; inturning edge-portions of said strips over upon said flat strip symmetrically on opposite sides of a line extending longitudinally of said flat strip; folding said flat strip along said longitudinal line causing inturned edge-portions of its outer fold-member to coincide with inturned edge-portions of the outer fold-member of said third-mentioned strip, with all said inturned edge-portions between the fold-members of said second-mentioned strip; and stitching together all of said inturned edge-portions and an edge-portion of said shorter folded strip along the side opposite its folded edge.

In testimony whereof, I have hereunto set my hand this 8th day of January, 1918.

EDWARD B. ROBY.

Copies of this patent may be obtained for five cents each, by addressing the "Commissioner of Patents, Washington, D. C."